United States Patent Office 3,077,395
Patented Feb. 12, 1963

3,077,395
METHOD OF PRODUCING GRANULATED FERTILIZER
John L. Ridgeway, Travelers Rest, S.C., assignor to Zonolite Company, Chicago, Ill., a corporation of Montana
No Drawing. Filed Nov. 8, 1954, Ser. No. 467,629
4 Claims. (Cl. 71—64)

This invention relates to fertilizers and more particularly to a method of producing high analysis fertilizer compositions in a novel form.

Normally, commercial fertilizers of the high analysis type, i.e. those whose composition is characterized by a relatively high content of nitrogen, phosphorus and potassium as for example 5–10–5, 4–12–4, 10–10–10, 20–12–8 and the like, have a density ranging in the neighborhood of about 60 to 70 pounds per cubic foot. The difficulty of handling the heavy bags of this type of fertilizer, particularly by the home gardener or week-end gardener, is well known. While the density of such fertilizer can be reduced by adding to it light-weight materials such as fillers of one kind or another, this is generally unsatisfactory for a number of reasons. Thus with ordinary mixtures of, say, sawdust and fertilizer salts, there will be segregation of the components, brought about by movements of the bag of fertilizer in shipment and the like. Because of such segregation, the product is generally not uniform, at best is an easily separable mechanical mixture of loosely bound components, and is in this, as well as in other important respects, completely different from and inferior to the product of my invention.

The present invention is directed to the production of a unique granulated fertilizer whose density can be controlled and varied over a wide range to produce a product ranging in density from say 12 to 70 pounds per cubic foot, with the preferred range being about 20 to 40 pounds per cubic foot for high analysis fertilizer and which has other unique attributes characterizing it as a new and important product.

In general, the technique of this invention is based on the association of exfoliated vermiculite with fertilizer chemicals, the grains of exfoliated vermiculite constituting the base or the skeleton so to speak, of a new form of fertilizer product. My novel product in the form of a particulate, generally free-flowing material is a complete fertilizer, i.e. it is composed of at least nitrogen, phosphorus and potassium; the fertilizer components—salts and the like—are uniformly attached to the vermiculite by adsorptive or absorptive forces and/or by impregnation in the interstitial spaces of the exfoliated vermiculite.

The advantages of the present invention are numerous and important. For example in the resulting composite fertilizer each particle is an individual unit of complete fertilizer; segregation of the components is completely avoided; and the low density of these novel fertilizers is particularly desirable to the home gardener who no longer has to wrestle with a heavy bag of standard fertilizer weighing 65 or 70 pounds per cubic foot.

Furthermore my new fertilizer has a more uniform and more beneficial effect than conventional fertilizers, because of the substantial uniformity of its particles, and its complete absence of segregated components, coupled with the fact that each particle or granule is a complete fertilizer unit in itself. And additionally, my new product has, coupled with its unique fertilizing properties, a conditioning effect on the soil which is unique. The soil conditioning effect is increased rather than decreased with the passage of time because as the fertilizer salts are dissolved and slowly leached away from the particle, the vermiculite skeleton remains, and assumes a more porous condition to aerate the soil and retain moisture.

In accordance with the technique of the present invention, I have produced a 10–10–10 fertilizer having a density of 20 to 25 pounds per cubic foot; lower analysis fertilizers having a density as low as 12 to 18 pounds per cubic foot can be produced. While higher analysis fertilizers are of course, somewhat denser, they are still, when produced in accordance with my technique, relatively light when compared to standard fertilizer; for example, I have produced a 20–12–8 fertilizer having a density of 35 pounds per cubic foot.

My novel technique lends itself to the accurate control of the density of any fertilizer mix either by formulation with appropriate amounts of exfoliated vermiculite, by the addition of low density mixed goods of the same formula or by combinations of such techniques.

The granule size of the finished fertilizer can, of course, be predetermined by selecting the particle size of the vermiculite used.

The following examples will serve to illustrate a number of successful specific embodiments of the invention and illustrate the flexibility of the invention particularly with respect to the various techniques and types of formulations that may be used.

Example 1

In accordance with one preferred technique of this invention, the desired amount of exfoliated vermiculite is placed in a drum mixer and triple super phosphate and muriate of potash, both in a finely ground condition are added thereto. After a thorough mix has been achieved the mixture is then wetted down with concentrated nitric acid, after which a commercial liquid ammoniating solution used in fertilizer production is added. Such ammoniating solutions are well known and consist, typically, of ammonium nitrate dissolved in water with ammonia added thereto. On addition of the concentrated nitric acid and the ammoniating solution to the mixture of expanded vermiculite, triple super phosphate and muriate of potash, an exothermic reaction takes place, producing sufficient heat to remove water from the mixture particularly if air is passed through the drum contents. The drum is continuously rotated while the mixture cools and after cooling, the resulting product in the form of individual granules of complete fertilizer is ready for bagging and ultimate use.

Following the aforesaid procedure in detail, it has been discovered that there is little or no chance for reversion of the triple super phosphate due to the small amount of water which is present.

This example will illustrate the production of a representative 10–10–10 fertilizer composition according to the present invention.

Into a drum mixer there was placed 642 pounds of expanded vermiculite having a volume of approximately 64 cubic feet, 455 pounds (8 cubic feet) of powdered triple super phosphate, and 333 pounds of powdered muriate of potash (4 cubic feet). These materials were stirred and mixed until the mixture was homogeneous. There was then added 163 pounds of concentrated nitric acid and 407 pounds of 2A, a commercial ammoniating solution. The drum mixer was kept in operation as the product was wetted, as it became heated (from the reaction) and as it subsequently cooled. The finished product in the form of discrete granules of complete fertilizer had a density of approximately 26 pounds per cubic foot and analyzed 10–10–10.

The chemical reaction accompanying the addition of nitric acid and ammoniating solution results in the formation of various salts and mixtures of salts such as ammonium nitrate, ammonium phosphate (in mixtures of mono-, di- and tri-salts) and various salts of potassium which are formed, in situ, right in, and on, the vermiculite granule, so that each such granule is a complete fertilizer unit.

Example 2

This example illustrates the preparation of a granular fertilizer which contains no phosphate material, represented by compositions such as 8–0–24, 14–0–14, and the like. In the commercial production of fertilizer, the nitrogen must be derived from solid materials such as ammonium sulfate, ammonium nitrate, urea, and the like which are expensive. The present invention permits the use of cheaper nitrogen solutions and/or anhydrous ammonia together with sulfuric or nitric acids of sufficient quantity to neutralize the free ammonia. The reaction can be carried out in conventional fertilizer-mixing equipment. Sufficient heat is generated to drive off substantially all of the free water in the batch giving a dry, granular fertilizer. The particle size distribution of the granules can be controlled by proper choice of the vermiculite particle size.

In preparing 8–0–24 fertilizer in accordance with this technique, using anhydrous ammonia as the nitrogen source, 282 pounds of exfoliated vermiculite are placed in a drum mixer, 960 pounds of sulfate of potash (50% $K_2O$) is added thereto, and the material mixed dry. Then 726 pounds of 60° Bé. sulfuric acid (77.6% $H_2SO_4$) are added. The moisture from the acid (163 pounds of $H_2O$) causes the potash material to adhere to the vermiculite granules. Anhydrous ammonia (82.2% N) is then introduced beneath the surface of the materials, and the reaction which takes place between the sulfuric acid and the ammonia results in the formation of solid ammonium sulfate. The potash particles are thereby cemented onto and in the vermiculite particles. Sufficient heat is generated to evaporate the water, giving a dry granular 8–0–24 fertilizer.

Example 3

A further illustration of my invention is represented by the following wherein a unique fertilizing composition is produced. The ingredients and amounts used in preparing this particular representative composition were as follows:

| | Lbs. |
|---|---|
| Vermiculite | 251 |
| Sulfate of potash (50% $K_2O$) | 960 |
| 60° Bé. sulfuric acid (77.6% $H_2SO_4$) | 318 |
| 2A[1] solution (41.6 %N) (21.7% neutralizing $NH_3$) | 394 |
| Dolomite | 200 |

[1] A commercial ammoniating solution.

In preparing this fertilizer composition, the materials are added to the batch in the order listed above, the dolomite being added after the acid has been neutralized by the ammonia in the "2A". A few pounds, say 10 to 30, of a plastic clay like bentonite or ball clay may be added to the batch to increase the hardness of the finished pellets and to help bind the potash and dolomite to the vermiculite particles.

It will be understood of course that other acids may be used to react with the ammonia, as for example, nitric, hydrochloric, or even carbonic. For fertilizer compositions which contain phosphate, phosphoric acid may be used in place of, or in conjunction with the other acids mentioned.

And it is to be further pointed out that ammonium sulfate, nitrate, phosphate, and the like, may be prepared on vermiculite by similar processes, and this material then dry mixed with other fertilizer materials.

Example 4

Another representative embodiment of the present invention is illustrated in the preparation of a fertilizer whose analysis is 20–12–8, and was produced as follows:

Dry ingredients consisting of urea, triple super phosphate, and muriate of potash all in powder form are mixed (dry) with exfoliated vermiculite. The powder mixture anchored itself into and onto the vermiculite as water was added to the mixture (only sufficient water being added to cement the salt particles into and onto the vermiculite); the water was subsequently removed by drying.

By way of more specific illustration 298 pounds of exfoliated vermiculite (30 cubic feet), 545 pounds of powdered triple super phosphate (9 cubic feet), 267 pounds of powdered muriate of potash (3 cubic feet), and 890 pounds (15 cubic feet) of powdered urea were thoroughly mixed until a fairly homogeneous product is obtained. 220 pounds of water were added, and the mixing continued until a homogeneous product was again achieved. The water was then removed by passing hot air through the mixer. The finished product, having a density of 35 pounds per cubic foot, and an analysis of 20–12–8 was ready for use. This product was characterized in part by having some of the powdered fertilizer material in the interstitial layers of the vermiculite and the remainder adhering to the outer surfaces as a "cemented-on" layer.

Other methods of producing my novel fertilizer compositions besides the above can be followed. Thus, a slurry can be made of the non-vermiculite solids with either water or ammoniating solution, and then applied to the exfoliated vermiculite as it is agitated, for example, in a rotating drum mixer. Ordinarily this procedure is somewhat less convenient than that described in the examples above because the addition of the slurry to the vermiculite has a tendency to sometimes cause the mixture to ball. However, this may be largely corrected by passing the drum contents through a screen.

Another alternate method consists in applying water or ammoniating solution on the vermiculite first and then adding the dry ingredients, agitating the mixture and then removing water by heating.

Still another method, within the scope and concept of my invention consists in applying to the dry vermiculite the bulk of the dry powdered ingredients, and then afterwards adding a solution or a suspension of the remaining part of the ingredients. For example, by way of illustration in Example 4 above, all of the powdered ingredients except the urea could be mixed with the vermiculite, and the urea then dissolved in the water and added to the remainder of the mixture.

Of course, use of exfoliated vermiculite to carry powders is not limited to the production of fertilizer compositions, and the broad concept thereof is generally applicable to any situation where the handling, transportation and movement of powder poses a problem.

Among the additional advantages of the novel products of my invention, is the fact that due to the ion exchange capacity and the absorptive characteristics of exfoliated vermiculite it can hold a significant amount, of the order of about one-half percent by weight, of ammonia ion against leaching out. Ammonia, bound to the vermiculite by these ion-exchange forces, approaches naturally-occurring nitrogen in many of its attributes and especially in its availability with respect to the physiological requirements of growing plants.

While my invention is described in terms of particular ingredients and ranges thereof, it is obvious that many modifications and variations in the nature and proportions of the ingredients may be made without departing from the spirit and scope of my invention, and only such limitations should be imposed as are indicated in the appended claims.

Having described my invention, I claim:

1. A method of producing a novel fertilizer composition in granular form which comprises intermixing exfoliated vermiculite and at least one fertilizer material selected from the group consisting of nitrogen-containing compounds, phosphate-containing compounds, and potash-containing compounds, with a mineral acid and an ammonia-containing fluid in neutralizing proportions, the heat produced in the reaction between said acid and the ammonia-containing fluid driving off water from said mixture, and the said fertilizer material and resulting ammonium salt being deposited as a coating enveloping the particles of said vermiculite.

2. The method in accordance with claim 1, wherein said mineral acid is selected from the group consisting of nitric, hydrochloric, sulfuric, phosphoric, and carbonic acids.

3. The method in accordance with claim 1, wherein said fertilizer material selected from said phosphate-containing compounds is triple super phosphate.

4. The method in accordance with claim 1, wherein said fertilizer material selected from said potash-containing compounds is muriate of potash.

References Cited in the file of this patent
UNITED STATES PATENTS

| | | |
|---|---|---|
| 2,192,939 | Slayter et al. | Mar. 12, 1940 |
| 2,240,859 | Rice | May 6, 1941 |
| 2,341,800 | Martin et al. | Feb. 15, 1944 |
| 2,669,510 | Dresser | Feb. 16, 1954 |
| 2,791,496 | Rice | May 7, 1957 |